United States Patent
Haumont et al.

(10) Patent No.: US 7,817,622 B2
(45) Date of Patent: Oct. 19, 2010

(54) UNLICENSED MOBILE ACCESS OPTIMIZATION

(75) Inventors: Serge Haumont, Helsinki (FI); Luis Pena Sierra, Madrid (ES); Jan Suumäki, Tampere (FI); Bimal Shrestha, Tampere (FI); Matti Wallenius, Tampere (FI)

(73) Assignee: Nokia Corporation (FI)

( * ) Notice: Subject to any disclaimer, the term of this patent is extended or adjusted under 35 U.S.C. 154(b) by 1092 days.

(21) Appl. No.: 11/298,622

(22) Filed: Dec. 12, 2005

(65) Prior Publication Data

US 2006/0262778 A1 Nov. 23, 2006

(30) Foreign Application Priority Data

May 19, 2005 (EP) .................. 05010857

(51) Int. Cl.
*H04L 12/66* (2006.01)
*H04W 40/00* (2009.01)
*H04W 72/00* (2009.01)
*H04B 7/00* (2006.01)

(52) U.S. Cl. .............. 370/352; 455/445; 455/450; 455/464; 455/509

(58) Field of Classification Search .............. 370/279, 370/280, 352–356; 455/445, 450, 464, 509
See application file for complete search history.

(56) References Cited

U.S. PATENT DOCUMENTS

| 6,414,950 | B1 * | 7/2002 | Rai et al. | 370/338 |
| 6,512,754 | B2 * | 1/2003 | Feder et al. | 370/338 |
| 7,389,412 | B2 * | 6/2008 | Sharma et al. | 713/153 |
| 2002/0089958 | A1 * | 7/2002 | Feder et al. | 370/338 |
| 2004/0017798 | A1 * | 1/2004 | Hurtta et al. | 370/352 |
| 2006/0146797 | A1 * | 7/2006 | Lebizay | 370/352 |
| 2006/0153124 | A1 * | 7/2006 | Kant et al. | 370/328 |

* cited by examiner

*Primary Examiner*—Curtis Kuntz
*Assistant Examiner*—Mohammad K Islam
(74) *Attorney, Agent, or Firm*—Mintz Levin Cohn Ferris Glovsky and Popeo, P.C.

(57) ABSTRACT

In a method for mobile access of a mobile device for a system providing cellular and non-cellular mobile access, the system comprises a serving node, a packet gateway node and the mobile device. The method comprises the steps of negotiating a direct tunneling connection between the mobile device and the packet gateway node by the serving node, wherein the direct tunneling connection is only dedicated to packet switched traffic of the mobile device using the non-cellular mobile access, and establishing the direct tunneling connection between the mobile device and the packet gateway node by the mobile device.

17 Claims, 6 Drawing Sheets

UNLICENSED MOBILE ACCESS OPTIMIZATION

BACKGROUND OF THE INVENTION

The present invention relates to a method and system supporting cellular and non-cellular access at the same time. Particularly, the present invention relates to a serving node, a mobile device and a gateway node as comprised in such a system and involved in such a method.

RELATED BACKGROUND ART

Presently, UMA (Unlicensed Mobile Access) is gaining popularity including a number of product launches.

The UMA was designed to provide access to cellular services (including handover) from any Internet connection. Here, a corresponding technical environment will be called General Access Network (GAN). The access is effected by a mobile station MS (or any kind of mobile device capable of having mobile access) connecting to a security gateway using a secure Internet Protocol such as IPsec, performing a SIM (subscriber identity module) authentication, and then connecting to the GANC (General Access Network Controller). The UMA Network Controller (UNC) as such a GANC comprises an A interface to a Mobile Services Switching Center (MSC) for circuit switched traffic and a Gb interface to a Serving GPRS (General Packet radio Service) Support Node (SGSN) for packet switched traffic. The mobility of a mobile device is handled by cellular mobility management protocols between a mobile device such as a mobile station MS and the MSC/SGSN.

The UMA is particularly well designed to provide cellular services to homes which are equipped with a WLAN AP (Wireless Local Area Network Access Point) and a broadband connection. Under the coverage of networks of the second (2G) or third generation (3G), there is no overhead over the cellular network. In WLAN, cellular voice traffic or GPRS data traffic is carried over a connection using IPsec. Though, GPRS data creates some overhead, but it is not a real issue over fast WLAN connections.

Here, the expression cellular access designates when a mobile device such as a mobile station MS uses the 2G/3G cellular network, and the expression General Access Network designates when a mobile device gains Internet access from any other network (e.g. from a WLAN hotspot; from a home WLAN plus DSL (Direct Subscriber Line); from a home WLAN plus cable; from a regional network according to WimAX (Worldwide Interoperability for Microwave Access); from pure Internet Protocol (IP) based wireless access systems enabling the provision of broadband services to mobile users).

In fact, the UMA is made of two parts: UMA voice (using the network elements MSC/VLR (Visitor Location Register)) and UMA data using the network elements SGSN and GGSN (Gateway GPRS Support Node).

The present application is related to UMA data. UMA data provides mobility and connectivity to operator services through the Gi interface.

A recent demand is that UMA data is optimized by reducing the number of hops.

At present, however, this is not the case, since data traffic (over WLAN) goes through a secure gateway (SGW), a SGSN and a GGSN, and the data is carried over the radio link using GPRS LLC (Logical Link Control) and SNDCP (Sub-Network Dependent Convergence Protocol) protocols.

As an alternative to UMA data, Mobile IP can be considered as it provides mobility. However, it has its own complexity, since a special client needs to be installed and configured in a mobile device, a dedicated authentication and registration are needed (in addition to the cellular one), and some overhead is added over the cellular radio interface. That is, Mobile IP is more optimized over WLAN, but less optimized over cellular network. Also, Mobile IP is not optimized for seamless mobility. Specifically, Mobile IP would require both a cellular mobility and a mobile IP mobility.

Another alternative for providing mobility are the mobility and multihoming protocol extensions for the Internet Key Exchange Protocol version 2 (MobIKE), which provide mobility of the IPsec connection. MobIKE perfectly complements UMA by providing mobility for the IPsec connection when used in a General Access Network. However, using MobIKE for the mobility between a GAN and a cellular network would require that IPsec is always used over the cellular network.

SUMMARY OF THE INVENTION

Therefore, it is an object of the present invention to overcome the above drawbacks of the prior art.

According to one aspect of the present invention, there is a method for mobile access of a mobile device in a system providing cellular and non-cellular mobile access, the system comprising a serving node, a packet gateway node and the mobile device, the method comprising: negotiating a direct tunneling connection between the mobile device and the packet gateway node by the serving node, wherein the direct tunneling connection is only dedicated to packet switched traffic of the mobile device using the non-cellular mobile access; and establishing the direct tunneling connection between the mobile device and the packet gateway node by the mobile device.

According to an alternative aspect, there is a method for mobile access of a mobile device in a system providing cellular and non-cellular mobile access, the system comprising a serving node, a packet gateway node, a secure gateway node and the mobile device, the method comprising: establishing a secure connection between the mobile device and the secure gateway node; negotiating a direct tunneling connection between the mobile device and the packet gateway node through the secure gateway node by the serving node, wherein the direct tunneling connection is only dedicated to packet switched traffic of the mobile device using the non-cellular mobile access; and establishing the direct tunneling connection through the secure gateway node between the mobile device and the packet gateway node by the mobile device.

Either one of these alternatives may further comprise using the same mobility management by the serving node for both the cellular and the non-cellular mobile access of the mobile device.

Also, in either one of these alternatives a layered protocol structure of a user plane for packet switched traffic using the non-cellular mobile access may contain a protocol stack for the mobile device including a tunneling protocol layer. The protocol stack for the mobile device may not include GSM specific protocols. In this case, LLC and SNDCP protocols may not be included.

According to another aspect of the present invention, there is provided a mobile device configured to use cellular and non-cellular mobile access in a system comprising the mobile device, a serving node and a packet gateway node, wherein the mobile device is further configured to establish a direct tunneling connection to a packet gateway node according to information received from a serving node; and to send and/or receive packet switched traffic over the direct tunneling connection only when using the non-cellular mobile access.

According to an alternative of this aspect, there is provided a mobile device configured to use cellular and non-cellular mobile access in a system comprising the mobile device, a serving node, a secure gateway node and a packet gateway node, wherein the mobile device is further configured to establish a secure connection between the mobile device and the secure gateway node; to establish a direct tunneling connection to a packet gateway node through the secure gateway node according to information received from a serving node; to send and/or receive packet switched traffic over the direct tunneling connection only when using the non-cellular mobile access.

Either one of these alternatives may further be configured to use the same mobility management with the serving node for both the cellular and the non-cellular mobile access.

Also, in either one of these alternatives a protocol stack of the mobile device may include a tunneling protocol layer. The protocol stack of the mobile device may not include GSM specific protocols. In this case, LLC and SNDCP protocols may not be included.

According to still another aspect of the present invention, there is provided a serving node configured to support mobile access for a mobile device in a system providing cellular and non-cellular mobile access, the system comprising the serving node, a packet gateway node and the mobile device, wherein the serving node is further configured to negotiate a direct tunneling connection between the mobile device and the packet gateway node, wherein the direct tunneling connection is only dedicated to packet switched traffic of the mobile device using the non-cellular mobile access.

According to an alternative of this aspect, there is provided a serving node configured to support mobile access for a mobile device in a system providing cellular and non-cellular mobile access, the system comprising the serving node, a packet gateway node, a secure gateway node and the mobile device, wherein the serving node is further configured to negotiate a direct tunneling connection between the mobile device and the packet gateway node through the secure gateway node, wherein the direct tunneling connection is only dedicated to packet switched traffic of the mobile device using the non-cellular mobile access.

Either one of these alternatives may further be configured to use the same mobility management for both the cellular and the non-cellular mobile access of the mobile device.

According to still another alternative, there is provided a system providing cellular and non-cellular mobile access, the system comprising a serving node according to an aspect of the present invention; a packet gateway node; a secure gateway node; and a mobile device according to an aspect of the present invention.

According to still another alternative, there is provided a system providing cellular and non-cellular mobile access, the system comprising a serving node according to an aspect of the present invention; a packet gateway node; a secure gateway node; and a mobile device according to an aspect of the present invention.

Advantages and further aspects of the present invention are as follows.

A solution is provided where data can go straight from a secure gateway (SGW) to a serving GPRS support node (SGSN) through the UMA Up interface, reducing one hop out of the data plane. Alternatively, it is also possible that UMA data is served even without the SGSN.

Further, there is provided a simplified UMA system where a SGSN controls the mobility, but tunnels are established directly between MS and GGSN.

Still further, in a system comprising a mobile device a mobility management protocol can be supported to register the mobile device with a session node and to provide mobility. The mobile device can also be adapted to receive parameters related to the establishment of an IP tunnel such as a destination address, an optional tunnel type and a tunnel ID. Still further, the mobile device can be configured to support an IP tunneling protocol adapted to send data traffic to the gateway indicated by the serving node in non-cellular access.

Accordingly, the mobile device can be adapted to use the same mobility management in a cellular network and in another General Access network such as WLAN and WimAX, but it is also adapted to use a specific tunneling protocol for the user plane when the mobile device is used in another (non-cellular) IP network, while the normal cellular user plane is kept without extra overhead, when the mobile device is present in an existing cellular network.

The system can also include a serving node adapted to provide mobility, to select an appropriate gateway node, and to provide the mobile device with parameters needed to establish a tunnel directly between the gateway and the mobile device, which tunnel is used by the mobile device in non-cellular access.

Furthermore, the system can include a gateway node adapted to negotiate the tunnel establishment with a serving node, to establish a tunnel with an end point indicated by the serving node, wherein in this case the mobile device is in non-cellular access, and to maintain the connection when the mobile device moves and the tunnel end point changes based on the update received from the serving node. Here, one option could be that a GGSN uses some already existing parameters in the GPRS Tunneling Protocol for the control plane GTP-C to know when the mobile device is in UMA access.

Optionally, the system comprises a security gateway (SGW), and the mobile device is adapted to always establish a secure connection to this SGW in non-cellular access before it communicates with the serving node and the gateway node.

Still optionally, the system comprises a UMA network controller (UNC) functionality, and the mobile device first registers with the UNC, wherein the parameters needed to establish a tunnel will be sent by the serving node to the mobile device through the UNC.

BRIEF DESCRIPTION OF THE DRAWINGS

Further advantages, effects and aspects of the present invention will be readily apparent from the following description of the preferred embodiments thereof which are to be taken in conjunction with the appended drawings, in which.

DETAILED DESCRIPTION OF THE PREFERRED EMBODIMENTS

In the following, preferred embodiments of the present invention are described by referring to implementation examples thereof. These implementation examples serve to illustrate ways of carrying out the present invention, but are in no way intended to be limiting.

Figure 1:
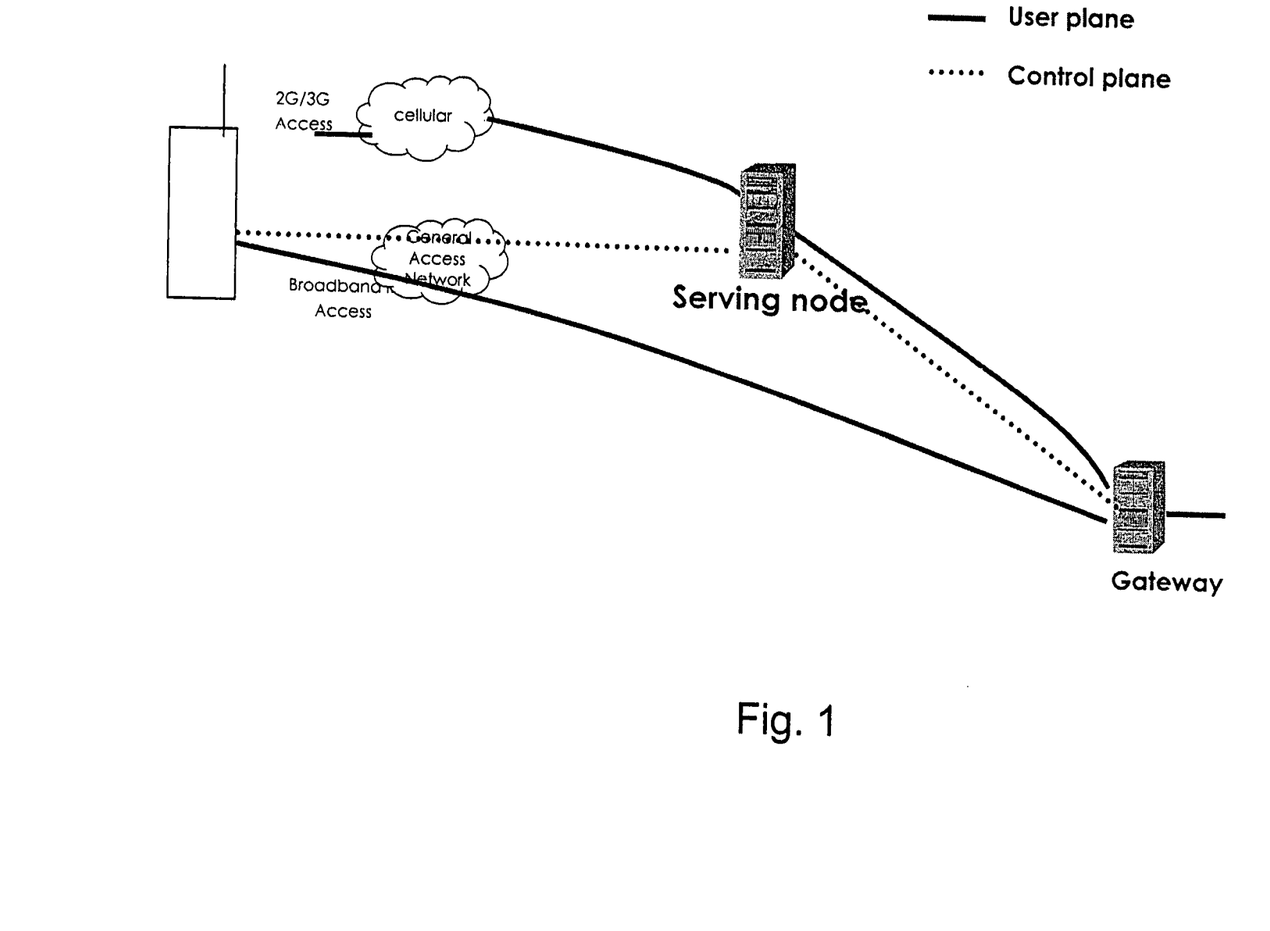
FIG. 1 schematically shows the principle underlying the present invention.

FIG. 1 schematically shows the principle underlying the present invention. Illustrated in FIG. 1 is the situation where a mobile device can have both cellular (e.g. 2G/3G) and non-cellular access (such as a broadband access over a General Access Network). In both cases, the control plane involves the serving node so as to preserve the mobility of the mobile device. However, while the user plane for cellular access also still involves the serving node with respect to data traffic, the user plane for data traffic concerning a mobile device having non-cellular access omits the serving node so that a direct connection between the mobile device and a packet gateway node is present. In this sense, "direct connection" means that the serving node is not actually involved in the data traffic.

This means that the serving node controls the mobility in a cellular as well as a General Access Network, and that the serving node also negotiates the direct tunnel connection between the mobile device and the packet gateway node, when the mobile device has non-cellular access, and to enable the mobile device to establish this connection. Hence, the mobile device tunnels the traffic to the packet gateway node, when located in a General Access Network. The packet gateway node hides the mobility issues toward any external network and forwards the packets from and to the mobile device.

According to an embodiment of the present invention, the tunneling technology used between the mobile device and the packet gateway node is the GTP protocol. Such a solution can be introduced without changes in a packet gateway node such as the GGSN. It requires providing the IP address of the GGSN and the tunnel endpoint identifier (TEID) to the mobile device. The mobile device will, when used in a GAN, encapsulate its traffic in GTP and address it directly to the GGSN using the IP address of the GGSN and the TEID.

Figure 2:
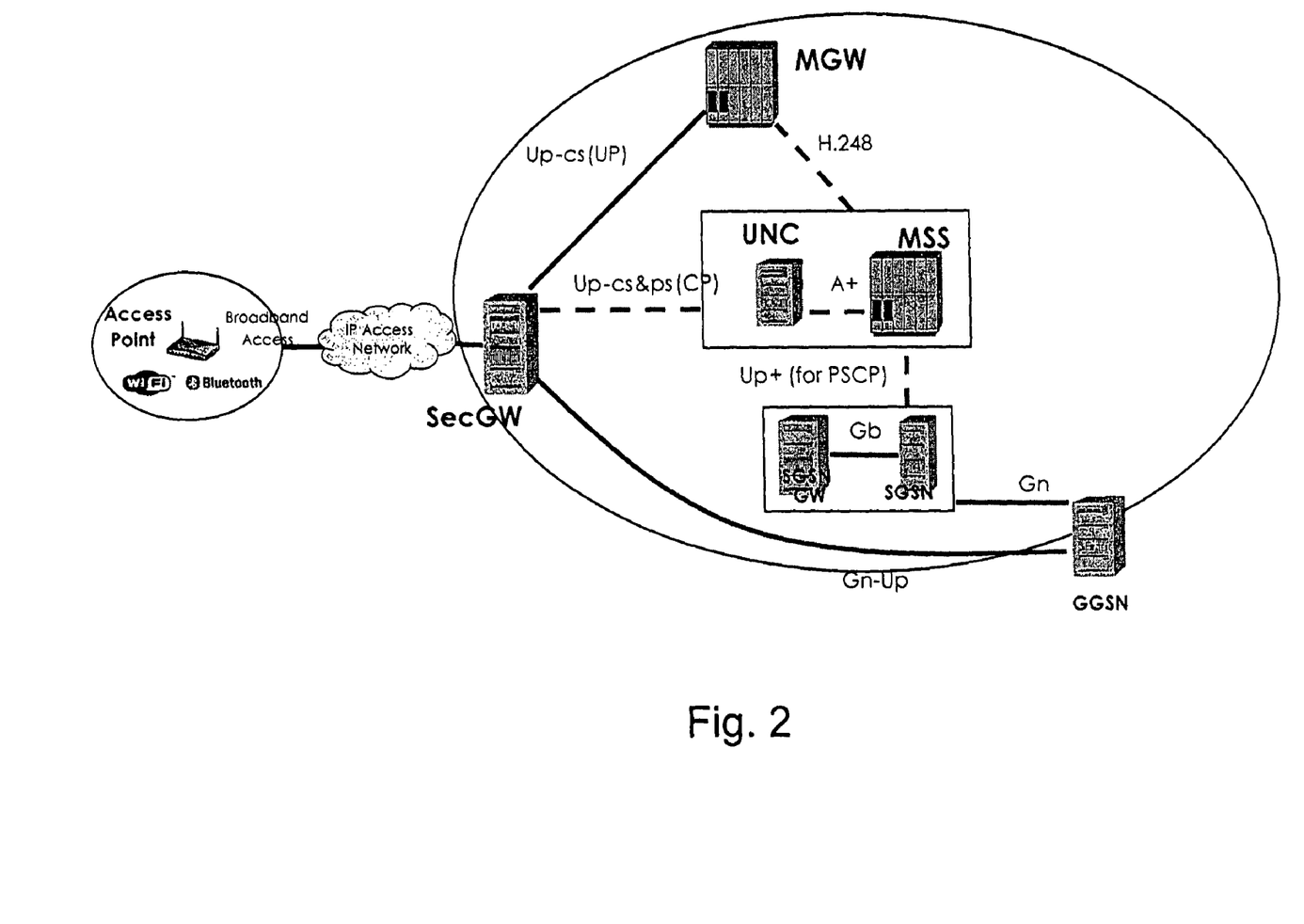
FIG. 2 schematically shows a data connection between a mobile device and a GGSN according to an embodiment of the present invention.

Preferably, the mobile device sends the GTP traffic over an IPsec connection towards a security gateway node. This embodiment of the present invention is shown in FIG. 2. FIG. 2 also depicts the circuit switched infrastructure (Media gateway MGW and MSC server). The tunneling parameters for the mobile device are sent over the Up+ and Up cs-ps interfaces. The tunneling parameters for the GGSN are sent over the Gn interface using the GPRS Tunneling protocol for the control plane GTP-C.

Figure 4:
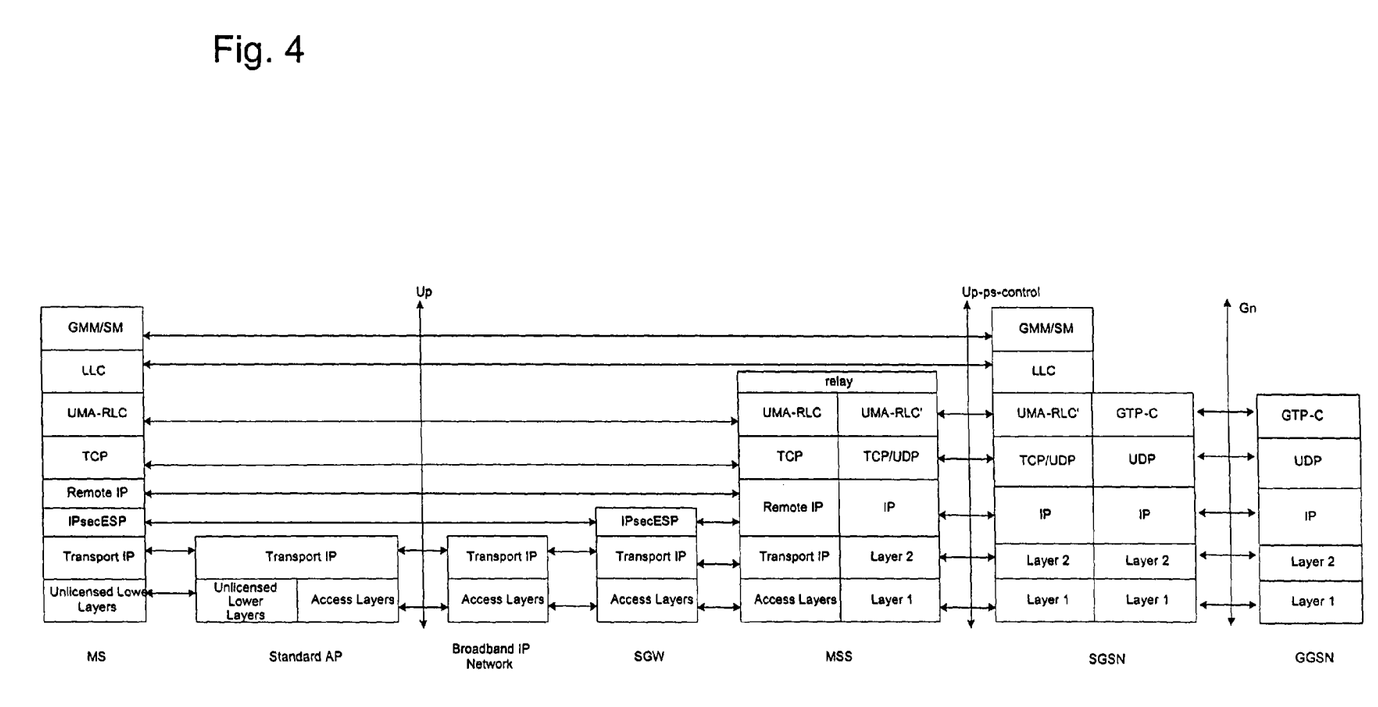
FIG. 4 schematically shows a control plane architecture as used in an embodiment of the present invention.
Figure 5:
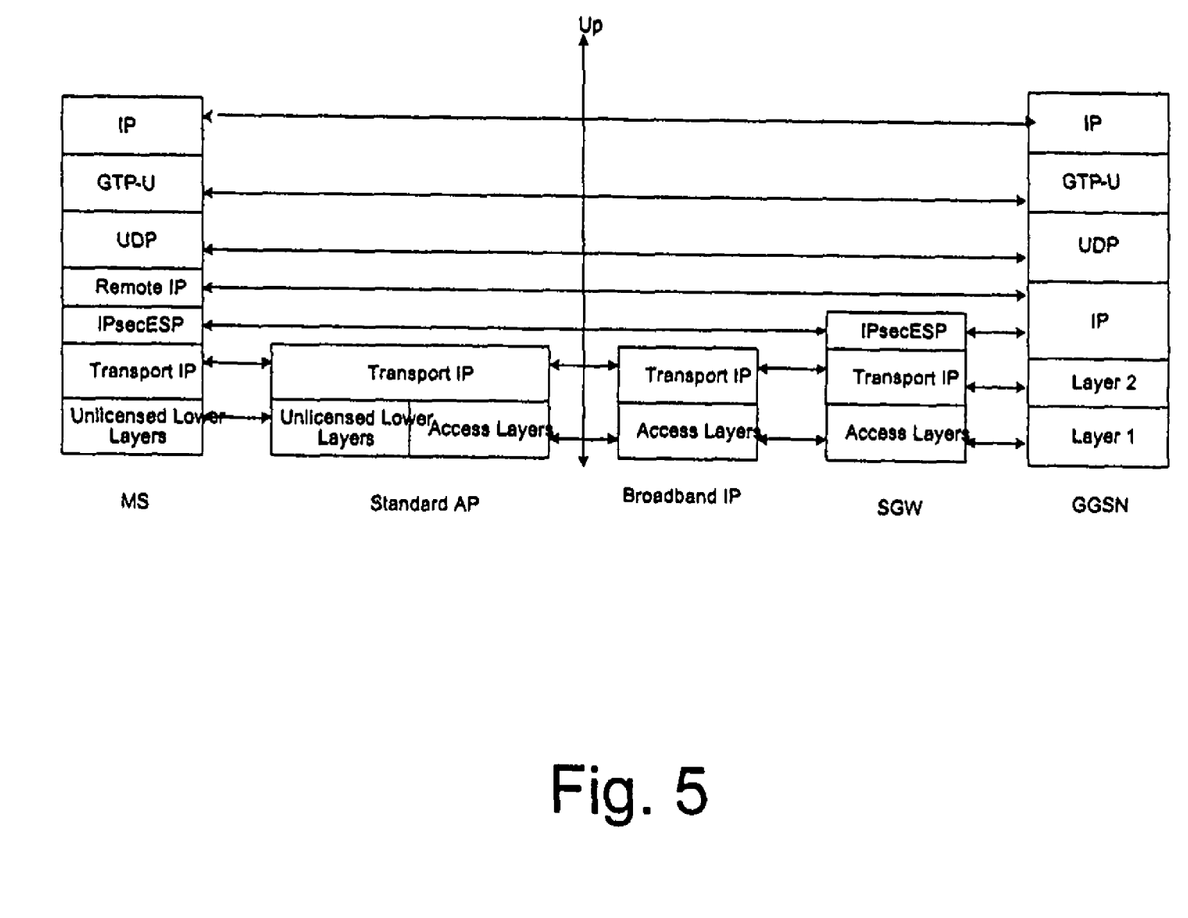
FIG. 5 schematically shows a user plane architecture optimized according to an embodiment of the present invention.

The protocol stack according to this architecture is shown in FIGS. 4 and 5, wherein FIG. 4 shows the control plane protocol stack and FIG. 5 shows the user plane protocol stack.

With respect to FIG. 4, the tunneling parameters are preferably provided to the mobile device in the UMA radio link control (UMA-RLC) and the UMA-RLC' protocol. Alternatively, these parameters may be provided through GMM/SM protocols (GPRS Mobility Management/Session Management), either in a Routing Area Update response message or in a Create PDP response message.

Turning now to FIG. 5, upon comparison with the layered protocol structure of the user plane for the A/Gb mode between a mobile station MS and a GGSN as depicted in the technical specification 3GPP TS 23.060, chapter 5.6 according to version 6.8.0 of this document, it is apparent that omitting the SGSN in the connection between the mobile station MS as a mobile device and the GGSN enables to leave out the layers of the Logical Link Control protocol (LLC) and the Subnetwork Dependent Convergence Protocol (SNDCP). Avoiding using the slow Gb interface for user data by not using the LLC and SNDCP protocols and thus removing the heavy GSM protocol stack from the mobile station as a mobile device optimizes the UMA data solution. As indicated in FIG. 5, an IP tunneling protocol adapted to send data traffic to the packet gateway which was indicated by the serving node needs to be implemented in the mobile devices (MS). Also, protocols such as IP and UDP (User Datagram Protocol) need to be implemented, which however is already the case for many mobile devices.

Figure 6:
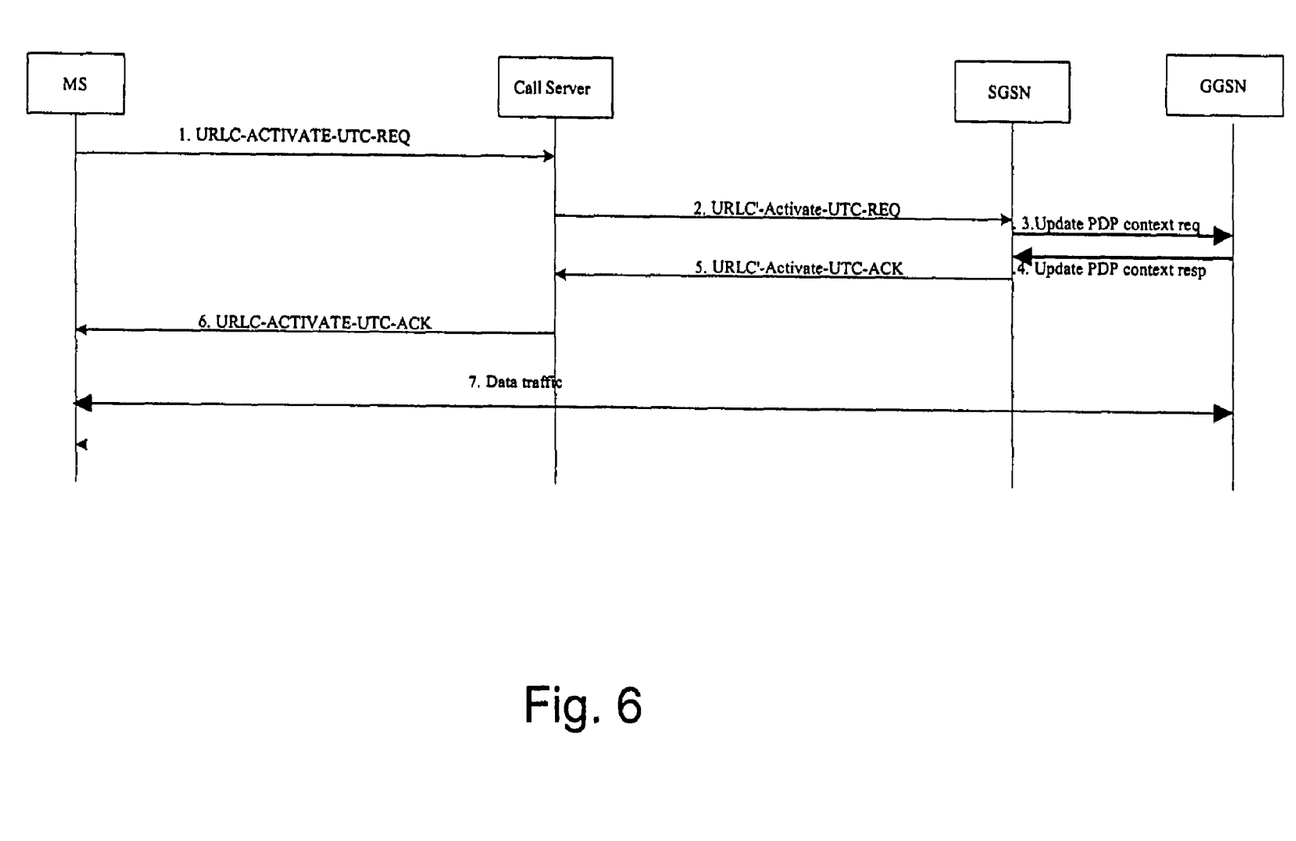
FIG. 6 schematically shows the signaling flow according to an embodiment of the present invention.

The signaling flow according to a preferred embodiment of the present invention is illustrated in FIG. 6. Specifically, the mobile device MS sends a message URLC-ACTIVATE-UTC-REQ (UMA RLC) to the Call Server (which means the UNC which could be integrated in the MSC). It contains the IP address allocated by the security gateway. In addition, it contains an indication that the mobile device MS supports direct tunneling. The Call Server will forward the request to a pre-configured SGSN by a message URLC'-Activate-UTC-REQ including an IP address allocated by a secure gateway node SGW, a temporary logical link. identifier TLLI, an IP/UDP port of the mobile device, a UMAN cell global identification CGI and an international mobile subscriber identity IMSI. The temporary logical link identifier TLLI might be used to find an appropriate SGSN. The SGSN sends an update (or create) PDP context (packet data protocol) to the GGSN indicating the IP address of the mobile device MS as the tunnel destination (normally, the GGSN receives the IP address of the SGSN in this field). If the mobile device MS already has a PDP context, an update PDP context will be sent to the GGSN(s) handling the PDP context of the mobile device. If the mobile device MS was not having a PDP context, a created message will be used. Then, the GGSN accepts the update. The response may contain a new IP address of the GGSN and the TEID. The SGSN replies with a message URLC'-Activate-UTC-ACK including the TLLI, the GGSN IP address, the TEID, and the IMSI to the Call Server. The Call Server sends a message URLC-ACTIVATE-UTC-ACK to the mobile device MS. Finally, GPRS data Packet Data Units PDU can be transferred between the mobile device MS and the GGSN.

Alternatively, instead of GTP, a tunnel technology more optimized for the radio link might be used such as minimal IP encapsulation in IPv4 (Internet Protocol version 4) or just adding the mobility header in IPv6 (Internet Protocol version 6).

A further embodiment is that the tunnel technology can be negotiated between the mobile device MS, the SGSN and the GGSN. The mobile device MS shall indicate the tunnel protocols it supports in message URLC-ACTIVATE-UTC-REQ (or in a context activation request message), and the SGSN will indicate the protocol to be used in non-cellular access in message URLC-ACTIVATE-UTC-ACK (or in the context activation response). The SGSN and the GGSN negotiate the tunneling protocols using GTP-C protocol. This is made by adding a new optional field in GTP-C to create a PDP context request indicating a list of extra tunneling technology proposed (with associated parameters). If the GGSN includes one of this extra tunneling technology in the response, this tunneling technology will be used. Normal GTP-U parameters should always be negotiated in case the SGSN changes or the mobile device MS moves back to cellular coverage. If no extra tunneling technology is indicated (e.g. because GGSN is a legacy GGSN), GTP-U will be used. Examples of tunneling technologies are IP in IP, minimal encapsulation, IPsec and GRE (generic routing encapsulation).

Figure 3:
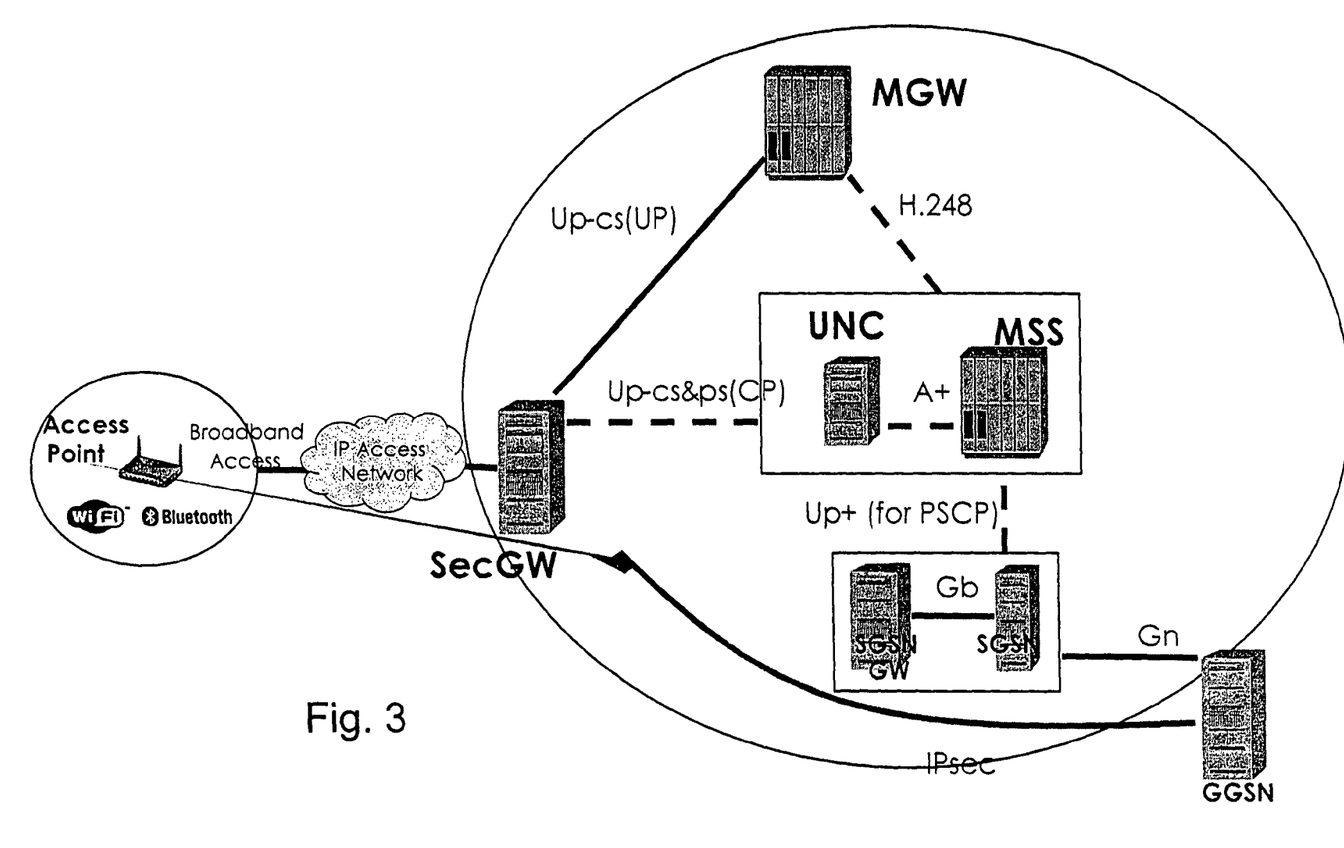
FIG. 3 schematically shows a data connection between a mobile device and a GGSN according to an embodiment of the present invention.

According to another preferred embodiment depicted in FIG. 3, the mobile device connects to the serving node SGSN over a pre-configured IPsec connection. The mobile device MS indicates the support for this direct IPsec connection to the GGSN (which requires that the mobile device MS supports two IPsec in parallel). The SGSN negotiates an IPsec connection with the GGSN. The SGSN provides the MSISDN/IMSI of the user to GGSN. The GGSN returns an indication that it directly supports an IPsec connection as well as its address for the IPsec connection. The mobile device MS then establishes directly a secondary IPsec connection to the GGSN. The GGSN authenticates the user and derives MSISDN and secret keys. The GGSN allocates the same address for this IPsec connection which was used for the cellular connection. Then, the GGSN forwards all downlink packets over this new IPsec connection. The mobile device MS sends all its user data through this secondary IPsec connection, providing a very optimized user plane. The mobile device's signaling traffic toward the SGSN and voice calls will still use the pre-configured security gateway. The GGSN still considers the PDP context as active, and keeps all PDP context information in memory. Preferably, the GGSN is still adapted to receive uplink packets over either the GTP tunnel or the IPsec tunnel (to avoid that delayed packets are lost during handover). If the user moves back to the cellular network, the SGSN handles the mobility normally and updates the GTP tunnel towards the GGSN to maintain the connection. The GGSN then starts using this GTP tunnel to forward downlink packets.

An alternative is that, when establishing the IPsec connection, the SGSN provides both the mobile device MS and the GGSN with a shared secret key (ciphering key), a temporary identity, and optionally a password. This avoids an extra authentication.

According to the above, the embodiments according to the present invention provide the mobile device MS with the possibility to use a single mobility management solution in cellular and non cellular access, while optimizing the user plane.

In addition, the above embodiments of the present invention allow an implementation in a proprietary manner as all new fields to be used are optional and can be ignored by foreign equipment. In this case, a normal UMA procedure can be used with foreign equipment.

As described above, according to preferred embodiments of the present invention, there is a method for mobile access of a mobile device for a system providing cellular and non-cellular mobile access, wherein the system comprises a serving node, a packet gateway node and the mobile device. The method comprises the steps of negotiating a direct tunneling connection between the mobile device and the packet gateway node by the serving node, wherein the direct tunneling connection is only dedicated to packet switched traffic of the mobile device using the non-cellular mobile access, and establishing the direct tunneling connection between the mobile device and the packet gateway node by the mobile device.

While it has been described above what is presently considered to be preferred embodiments of the present invention it is to be understood by those who are skilled in the art that various modifications thereof may be made without deviating from the spirit and scope of the present invention as defined by the appended claims.

The invention claimed:

1. A method for mobile access in a system providing cellular and non-cellular mobile access, the method comprising:
   establishing a secure connection between a mobile device and a secure gateway node;
   negotiating a direct tunneling connection between the mobile device and a packet gateway node through the secure gateway node by a serving node, wherein the direct tunneling connection is only dedicated to packet switched traffic of the mobile device using the non-cellular mobile access, wherein the mobile device is configured for mobile access in a system providing cellular access from the mobile device to the packet gateway node via the serving node, and non-cellular access from the mobile device directly to the packet gateway node via the negotiated tunneling connection such that the non-cellular access does not pass through the serving node, the system comprising the serving node, the packet gateway node and the mobile device; and
   establishing the direct tunneling connection between the mobile device and the packet gateway node through the secure gateway node by the mobile device.

2. The method according to claim 1, further comprising, using the same mobility management by the serving node for both the cellular and the non-cellular mobile access of the mobile device.

3. The method according to claim 1, wherein a layered protocol structure of a user plane for packet switched traffic using the non-cellular access contains a protocol stack for the mobile device including a tunneling protocol layer.

4. The method according to claim 3, wherein the protocol stack for the mobile device does not include Global System for Mobile (GSM) specific protocols.

5. The method according to claim 4, wherein Logic Link Control (LLC) and Subnetwork Dependent Convergence Protocol (SNDCP) protocols are not included.

6. A computer program product comprising processor implementable instruction portions for performing all the steps of a method according to claim 1.

7. The computer program product according to claim 6, wherein said computer program product comprises a software medium storing said processor implementable instruction portions.

8. The computer program product according to claim 6, wherein said computer program product is directly loadable into an internal memory of a computer.

9. A signal carrying processor implementable instructions for controlling a computer to carry out all the steps of a method according to claim 1.

10. An apparatus for use in cellular and non-cellular mobile access, the apparatus configured to:
    establish a secure connection between the apparatus and a secure gateway node, wherein the apparatus is configured to use cellular access from the apparatus to a packet gateway node via a serving node, and non-cellular mobile access in a system comprising the apparatus, a serving node, the secure gateway node and the packet gateway node;
    establish a direct tunneling connection to the packet gateway node through the secure gateway node according to information received from the serving node such that the non-cellular access from the apparatus to the packet gateway node does not pass through the serving node; and
    perform at least one of sending and receiving packet switched traffic over the direct tunneling connection only when using the non-cellular mobile access.

11. The mobile device according to claim 10, further configured to use a same mobility management with the serving node for both the cellular and the non-cellular mobile access.

12. The mobile device according to claim 10, wherein a protocol stack of the mobile device includes a tunneling protocol layer.

13. The mobile device according to claim 12, wherein the protocol stack of the mobile device does not include Global System for Mobile (GSM) specific protocols.

14. The mobile device according to claim 13, wherein Logic Link Control (LLC) and Subnetwork Dependent Convergence Protocol (SNDCP) protocols are not included.

15. An apparatus to support mobile access in a system providing cellular and non-cellular mobile access, the system configured to:
   operate as a serving node; and
   negotiate a direct tunneling connection between a mobile device and a packet gateway node through a secure gateway node such that the non-cellular mobile access from the mobile device to the packet gateway node does not pass through the serving node, wherein the direct tunneling connection is only dedicated to packet switched traffic of the mobile device using the non cellular mobile access, wherein the mobile device is configured to use cellular access from the mobile device to the packet gateway node via the serving node and non-cellular access in a system comprising the serving node, the packet gateway node, the secure gateway node and the mobile device.

16. The serving node according to claim 15, further configured to use the same mobility management for both the cellular and the non-cellular mobile access of the mobile device.

17. A system providing cellular and non-cellular mobile access, the system comprising:
   a packet gateway node;
   a secure gateway node;
   a mobile device; and
   a serving node configured to support mobile access for the mobile device in the system providing cellular access from the mobile device to the packet gateway node via the serving node and non-cellular mobile access to the mobile device, the system comprising the serving node, the packet gateway node, the secure gateway node and the mobile device, wherein the serving node is further configured to negotiate a direct tunneling connection between the mobile device and the packet gateway node through the secure gateway node such that the non-cellular mobile access from the mobile device to the packet gateway node does not pass through the serving node, wherein the direct tunneling connection is only dedicated to packet switched traffic of the mobile device using the non-cellular mobile access;
   wherein the mobile device is further configured to establish a secure connection between the mobile device and the secure gateway node to establish a direct tunneling connection to the a packet gateway node through the secure gateway node according to information received from the a serving node, and send and/or receive packet switched traffic over the direct tunneling connection only when using the non-cellular mobile access.

* * * * *